United States Patent [19]

Kato

[11] Patent Number: 4,929,876

[45] Date of Patent: May 29, 1990

[54] ELECTRIC WINDSHIELD WIPING APPARATUS

[75] Inventor: Masaru Kato, Hiratsuka, Japan

[73] Assignee: Jidosha Denki Kogyo Kabushiki Kaisha, Kanagawa, Japan

[21] Appl. No.: 233,986

[22] Filed: Aug. 12, 1988

Related U.S. Application Data

[63] Continuation-in-part of Ser. No. 26,921, Mar. 17, 1987, abandoned.

[30] Foreign Application Priority Data

Apr. 14, 1986 [JP] Japan ........................... 61-56322[U]

[51] Int. Cl.⁵ ........................................ B60S 1/08

[52] U.S. Cl. ........................ 318/444; 318/DIG. 2

[58] Field of Search ............... 318/443, 444, DIG. 2; 15/250.16, 250.17

[56] References Cited

U.S. PATENT DOCUMENTS

| | | | |
|---|---|---|---|
| 4,309,646 | 1/1982 | Liedtke et al. | 318/443 |
| 4,692,677 | 9/1987 | Bauer et al. | 318/DIG. 2 X |
| 4,787,114 | 11/1988 | Okudaira | 15/250.16 X |

FOREIGN PATENT DOCUMENTS

| | | | |
|---|---|---|---|
| 2756744 | 6/1979 | Fed. Rep. of Germany | 15/250.17 |
| 3627561 | 10/1987 | Fed. Rep. of Germany | 15/250.17 |
| 59-96031 | 6/1984 | Japan | 15/250.17 |
| 62-247947 | 10/1987 | Japan | 15/250.16 |
| 8803485 | 5/1988 | PCT Int'l Appl. | 15/250.16 |

*Primary Examiner*—Bentsu Ro

*Attorney, Agent, or Firm*—Sughrue, Mion, Zinn, Macpeak & Seas

[57] ABSTRACT

An electric windshield wiping apparatus, in which a unit for electrically changing the performance of the reverse rotation of wiper motor is selectively connected between the wiper control mechanism and wiper motor so that in the non-used state, the wiper is stored either at the lower turning position or a yet lower concealed position.

3 Claims, 5 Drawing Sheets

ELECTRIC WINDSHIELD WIPING APPARATUS

This is a continuation-in-part of application Ser. No. 07/026,921 filed Mar. 17, 1987, now abandoned.

BACKGROUND OF THE INVENTION

1. Field Of The Invention

This invention relates to an electric windshield wiper apparatus for wiping a windshield or other window of, for example, an automobile. It more particularly relates to an electric windshield wiper having a concealed wiper unit housing a wiper blade in a concealed position during the time it is not being used, and in which it is possible to change-over the concealing operation.

2. Related Art Statement

An electric windshield wiping apparatus may have a concealed wiper unit for housing the wiper blade in a concealed position during periods of non-use. An example of such an apparatus has a design as shown in FIGS. 1 and 2.

That is, as shown in FIG. 1, an electric windshield wiping apparatus 100 has a circuit composed of a wiper motor 102 provided with an autostop switch 101, a change-over relay 103, and a wiper switch 104. The mechanical structure, shown in FIG. 2, mainly comprises a link coupling mechanism 105 connected to the wiper motor 102, a wiper arm 107 attached to a pivot 106 constituting a part of the link coupling mechanism 105 and a wiper blade 108 attached to the top portion of the wiper arm 107.

For instance, when the wiper switch 104 is shifted to a low-speed position LO, a circuit is established from a power source through a relay coil **103*a* in the change-over relay 103 and through a B terminal in the wiper switch 104 to ground. Completion of this circuit actuates the relay coil 103*a*, whereby relay contacts 103*b* and 103*c* on the change-over relay 103 contact with respective lower contacts. The closing of the contact 103*b* completes a circuit from the power source through the relay contact 103*b* on the change-over relay 103 through the M terminal on the wiper motor 102 to an L terminal in the wiper motor 102 which is connected to an L terminal in wiper switch 104 and thence to ground. Thereby, current is supplied to the wiper motor 102 to rotate the wiper motor 102** in the forward direction.

The rotation of the wiper motor 102 is converted into reciprocating movement of the wiper arm 107 through the link coupling mechanism 105. Thereby, the wiper blade 108 attached to the top portion of the wiper arm 137 is pushed to slide on a wiped surface 110 of a glass window 109 at a region extending from an upper turning position A to a lower turning position B.

Then, when the wiper switch 104 is changed to an OFF position at the end of use, the circuit extending from the change-over coil **103*a* through the wiper switch 104 to ground earth is interrupted. At the same time, when a P terminal in the autostop switch 101 is connected to its grounded E terminal (that is, the wiper blade 108 is positioned in a non-rest area on the wiped surface 110), the current flowing to the relay coil 103*a* passes through a diode 103*d* to the relay contact 103*c* and thence to the P terminal in the autostop switch 101. This current then passes the grounded E terminal in the autostop switch 101 to ground. This current thus continues the suction of relay contacts 103*b* and 103*c* by the relay coil 103*b* in the downward, contacting direction and the wiper motor 102** continues to rotate forwardly.

Since the P terminal of the autostop switch 101 is connected to its B terminal in conjunction with rotation of the wiper motor 102 (that is, the wiper blade 108 reaches the lower turning position B), the current flowing to the relay coil **103*a* is then stopped to return the relay contacts 103*b* and 103*c* in the upper, non-contacting direction. As a result of this condition, the following circuit is established. The power source is connected to the B terminal in the autostop switch 101 and in this condition to the P terminal in the autostop switch 101. The circuit continues through the P terminal in the wiper switch 104, which in the OFF condition is connected to its L terminal. The circuit continues through the L terminal in the wiper motor 102 and then out through its M terminal to the change-over relay contact 103*b* and finally to ground. Thereby, a current having a polarity opposite to that of the above-described current is supplied to the wiper motor 102 to rotate reversely the wiper motor 102 in a direction opposite to the aforementioned rotation direction. Thus, the wiper blade 108 is further moved downward from the lower turning position B. That is, the wiper motor 102 is electrically controlled by the operation of the autostop switch 101 in accordance with the stop position of the wiper blade 108 so that the wiper blade 108 is stopped at a position lower than the lower turning position B, for example, at a housing position C beneath a hood 111**.

Namely, when the wiper blade 108 reaches the housing position C by the reverse rotation of the wiper motor 102, the P terminal of the autostop switch 101 is connected to its E terminal in conjunction with rotation of the wiper motor 102. Then, a motor armature short-circuit is established from the M terminal on the wiper motor 102 through the relay contact **103*b* on the change-over relay 103 and through the E terminal of the autostop switch 101 and its P terminal and through the P terminal in the wiper switch 104 and its L terminal to the L terminal on the wiper motor 102, so that the wiper motor 102** is stopped immediately by the dynamic braking.

In the above electric windshield wiping apparatus, however, if the wiper blade 108 is at a housed state beneath the hood 111 during a snowfall, it cannot be smoothly operated due to the weight of snow lying on the concealed housing for the wiper blade 108 beneath the hood 111 or due to the freezing of the snow. For this reason, it is necessary to remove the snow or ice from the concealed housing before the operation of the wiper blade 108 so that the removal operation becomes troublesome.

When the wiper blade 108 is frozen to the vehicle body, if the wiper motor 102 is actuated, it is possible that the wiper motor is burned out or the rubber portion of the wiper blade 108 may be broken. Therefore, a method is generally used wherein the wiper arm 107 is raised up so as to break the contact of the wiper blade 108 with the vehicle body. However, in such a concealed wiping apparatus, the wiper arm 107 cannot be raised because it is housed beneath the hood 111. If the wiper arm 107 is broken due to the accumulated snow, it is difficult to replace the broken arm 107 with a new one and also difficult to perform the cleaning operation.

Therefore, there have been attempts to modify the concealing operation of the wiper blade 108 to guard against the above problem. For instance, one method reverses the attached position of a motor arm constituting a part of the link coupling mechanism 105 connected to the wiper motor 102 by 180°. Another method replaces the described wiring of the wiper motor 102 with a previously arranged substitute wiring so as to not perform the concealing operation. Yet another method changes the position of the wiper arm 107 attached to the pivot 106. In these methods, the operation becomes difficult and the handling is poor. Furthermore, in certain cases the driver must get out of the passenger compartment to perform the required but troublesome operation.

SUMMARY OF THE INVENTION

It is an object of the invention to provide an electric windshield wiping apparatus which can simply confirm the housing of the wiper blade.

It is another object of the invention to provide an electric windshield wiping apparatus in which the concealing operation can be changed over by a change-over unit.

According to the invention, there is provided an electric windshield wiping apparatus comprising a wiper motor, a link coupling mechanism connected to the wiper motor, and a wiper blade reciprocally moving between an upper turning position and a lower turning position on a wiped surface of a glass window. A wiper control mechanism controls the reciprocating movement of the wiper blade. Concealing means move the wiper blade downward from the lower turning position by reversing the rotation of the wiper motor for a given time and stopping at a given housing position during periods of non use. The invention is characterized in that a unit for electrically changing the reverse rotation of the wiper motor (or the concealing operation of the wiper motor) is arranged in a detachable state between the wiper control mechanism and the wiper motor.

In a preferred embodiment of the invention, the change-over unit is arranged near to the driver's in an automotive vehicle.

BRIEF DESCRIPTION OF THE DRAWINGS

The invention will be described with reference to the accompanying drawings, wherein.

DESCRIPTION OF THE PREFERRED EMBODIMENTS

Figure 1:
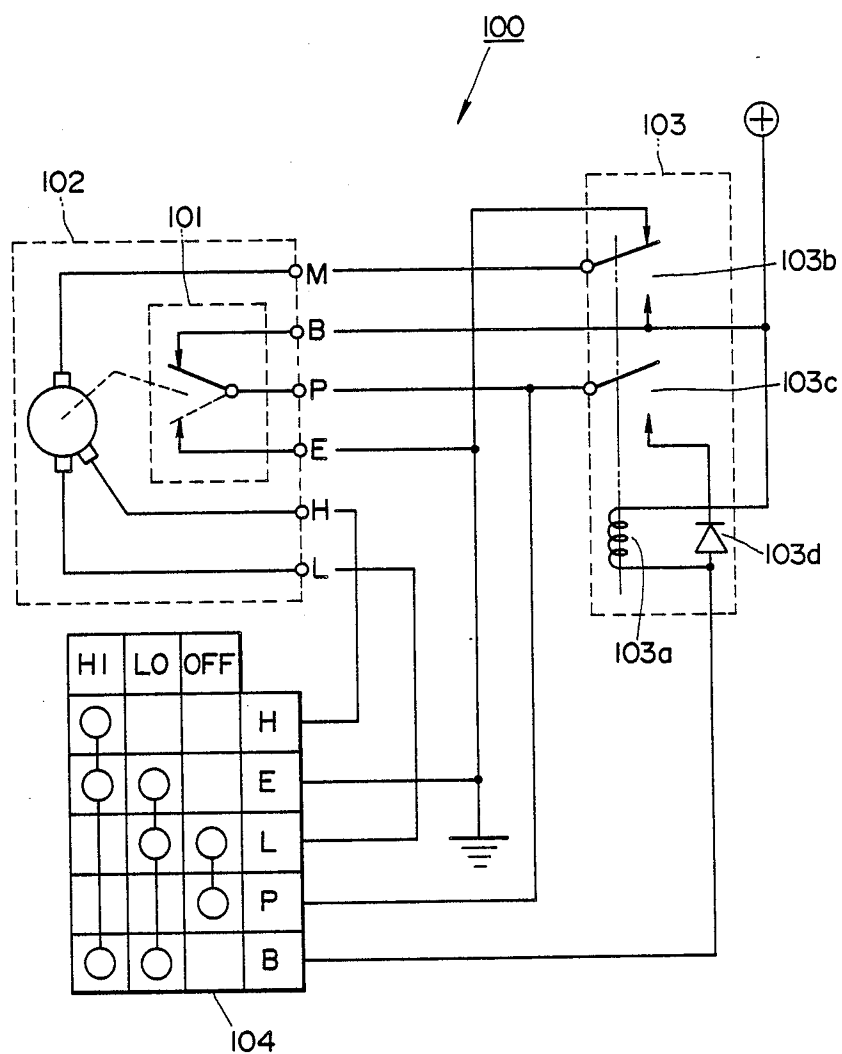
FIG. 1 is an outline of a circuit in the conventional electric windshield wiping apparatus.
Figure 2:
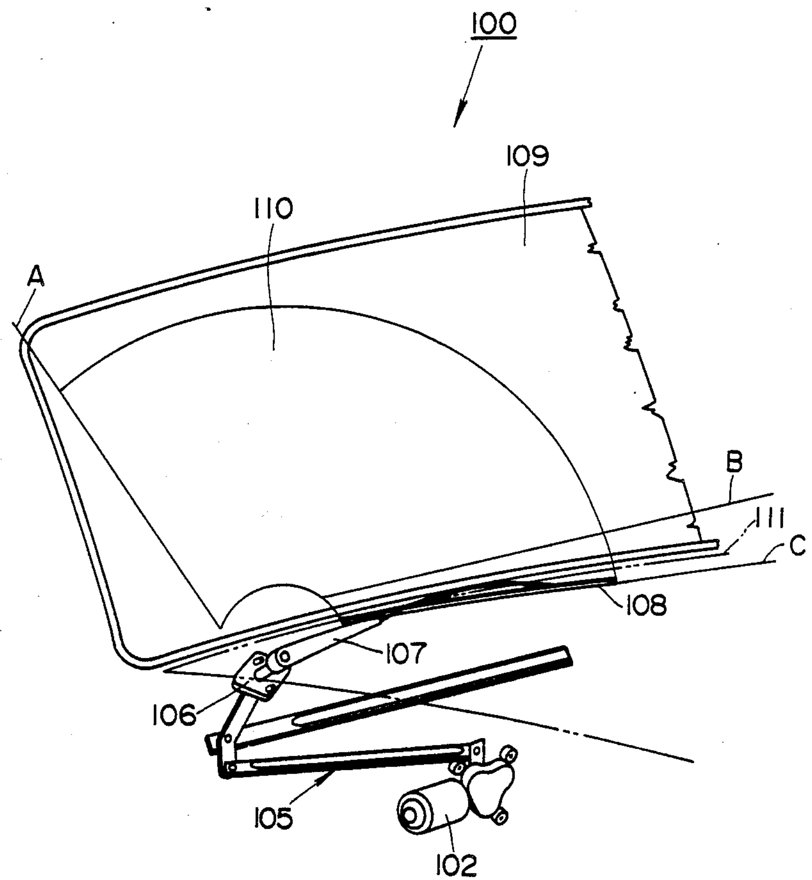
FIG. 2 is a schematic view illustrating an outline of the conventional electric windshield wiping apparatus.
Figure 3:
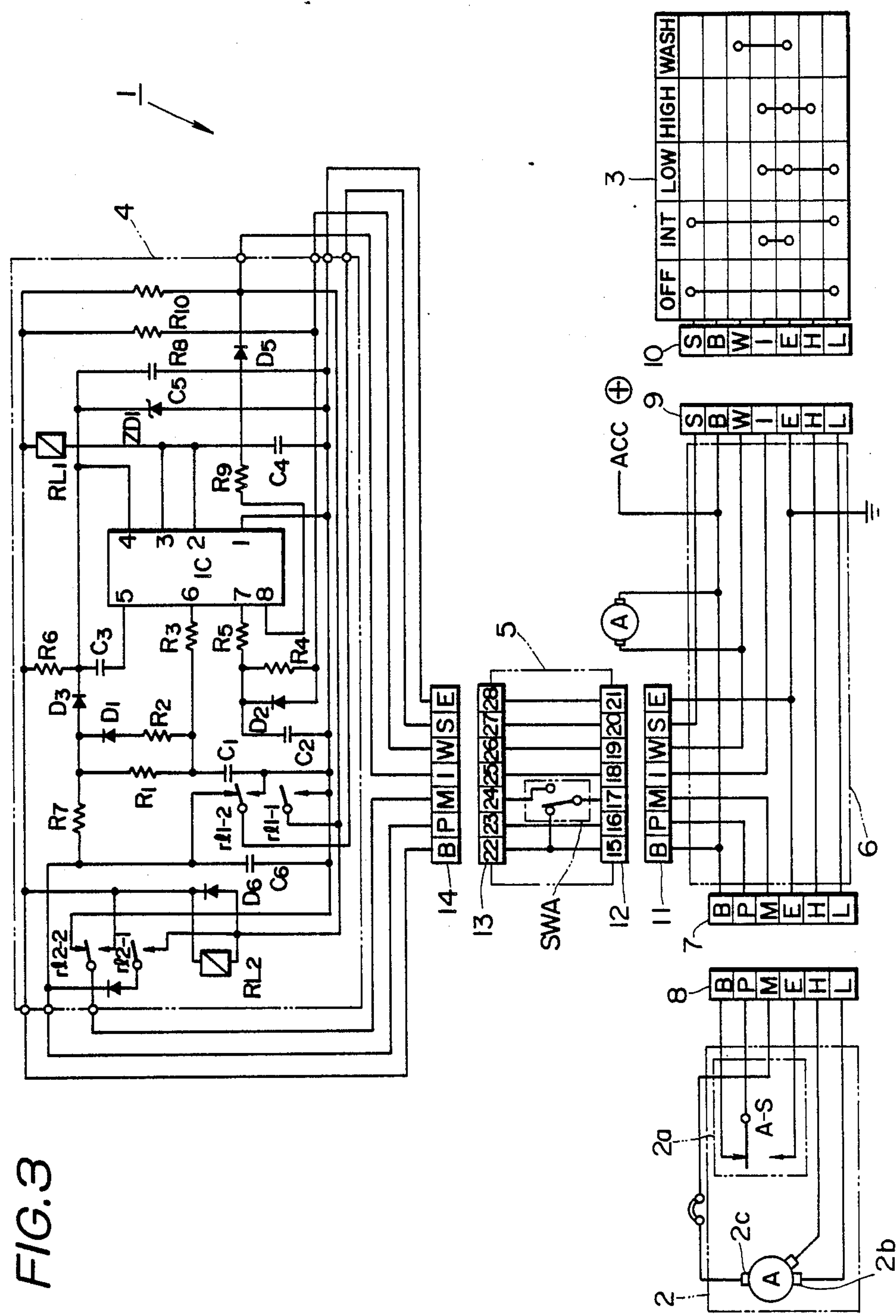
FIG. 3 is a circuit diagram in an embodiment of the electric windshield wiping apparatus according to the invention.

FIG. 3 shows a first embodiment of an electric windshield wiping apparatus 1 according to the invention. This apparatus 1 has a circuit composed of a wiper motor 2 provided with an autostop switch 2*a* opening and closing a circuit in conjunction with rotation of said wiper motor 2. It further has a wiper switch 3 controlling the rotation of the wiper motor 2, an intermittent amplifier 4 and a reverse controlling unit 5 for changing the performance of the reverse rotation of the wiper motor 2. The mechanical structure mainly comprises a link coupling mechanism 105 connected to the wiper motor 2, a wiper arm 107 attached to a pivot constituting a part of the link coupling mechanism 105 and wiper blade 108 attached to the top portion of the wiper arm 107 in the same structure as that shown in FIG. 2.

When such an apparatus in mounted onto a vehicle body, the reverse controlling unit 5 is detachably connected between the intermittent amplifier 4 and a wiring harness 6, and a connector 7 of a wiring harness 6 is connected to a commector 8 of the wiper motor 2, while another connector 9 of the wiring harness 6 is connected to a connector 10 of the wiper switch 3. Furthermore, a connector 12 of the reverse controlling unit 5 is connected to yet another connector 11 of the wiring harness 6, while a connector 13 of the reverse controlling unit 5 is connected to a connector 14 of the intermittent amplifier 4.

The reverse controlling unit 5 is provided at its connecting ends with the couplers 12 and 13 as mentioned above, wherein a terminal 15 of the one connector 12 is always connected to a terminal 22 of the other connector 13, a terminal 16 of the one connector 12 is always connected to a terminal 23 of the other connector 13 and a terminal 18 of the connector 12 is always connected to a terminal 25 of the other connector 13. Similarly, a terminal 19 of the one connector 12 is always connected to a terminal 26 of the other connector 13, a terminal 20 of the one connector 12 is always connected to a terminal 27 of the other connector 13 and a terminal 21 of the one connector 12 is always connected to a terminal 28 of the other connector 13. Moreover, a change-over switch SWA is arranged for the connecting the terminal 17 of the one connector 12 to either the terminal 22 or a terminal 24 of the other connector 13.

The wiper motor 2 is rotated forwardly or reversely by the supplying of current on the terminal 2*b* thereof, and the rotation of said wiper motor 2 is converted into reciprocally rotational movement of the pivot shaft through the link coupling mechanism. The wiper arm is moved reciprocally by the reciprocal rotational movement of the pivot shaft, and the wiper blade attached to the top portion of the wiper arm is pushed so as to slide on a wiped surface.

After the couplers 7 and 8 have been joined, the couplers 9 and 10 have been joined, the couplers 11 and 12 have been joined and the couplers 13 and 14 have been joined, when the wiper switch 3 is change into a LOW position, I and L terminals of the wiper switch 3 and a low speed terminal 2*b* of the wiper motor 2 are grounded.

On the other hand, since the I terminal of the wiper switch 3 is grounded, a terminal 3 of an integrated circuit IC in the intermittent amplifier 4 is actuated to excite a relay coil RL1, whereby relay contacts rl1-1 and and rl2-2 are changed over to their lower positions in the figure. At the same time, a relay coil RL2 is excited to change over relay contacts rl2-1 and rl2-2 to their lower positions in the figures . Therefore, a positive current is supplied to a terminal 2*c* of the wiper motor 2 through the relay contact rl2-2 to rotate the wiper motor 2 at a low speed.

Then, when the wiper switch 3 is changed to an OFF position, since the terminal 17 of the reverse controlling unit 5 and hence the M terminal of the connector 11 are connected to its B terminal, the current is always supplied to a terminal 2*c* of the wiper motor 2. On the other hand, since the grounding circuit of coil RL2 is shut-off by the disappearance of the excited state of the coil RL1, the coil RL2 also assumes a non-excited state and respective relay contacts rl1-1, rl1-2, rl2-1 and rl2-2 are restored to upper positions in the figure. Also, the wiper motor 2 continues to rotate forwardly until the P terminal of the autostop switch *2a* is electrically connected with its B terminal (when the wiper blade 108 is on the wiped surface 110). This continued rotation occurs because the terminal *2b* of the wiper motor 2 is grounded through the circuit from the terminal *2b* through the L terminals of the couplers 8 and 7, and the L terminals and S terminals of the couplers 9 and 10, and through the S terminals of the couplers 11 and 14, and through the relay contact 1l1-2, and through the P terminals of couplers 14, 11, 7 and 8, and through the autostop switch *2a*, and through the E terminals of the couplers 8 and 7 to ground.

When the P terminal of the autostop switch *2a* is connected to its B terminal in conjunction with rotation of the wiper motor 2 (that is, the wiper blade 108 reaches the lower turning position), plate voltage is impressed on the terminal *2b* of the wiper motor 2 as well as its terminal *2c* through the circuit from the power source through the B terminals of the couplers 7 and 8 and the autostop switch *2a*, and through the P terminals of the couplers 8, 7, 11 and 14, and through the relay contact rl1-2, and through the S terminals of the couplers 14, 11, 9 and 10 and through the terminals L of the couplers 10, 9, 7 and 8 to the terminal *2b* of the wiper motor 2. Consequently, the rotation of the wiper motor 2 is stopped immediately, so that the wiper blade is stopped at the lower turning position and is never housed in the concealed position.

In the above illustrated embodiment, although the switch SWA of the reverse controlling unit 5 is explained for the mode of not using the concealed housing, the use of the concealed housing can easily be attained by changing over the switch SWA.

Figure 4:
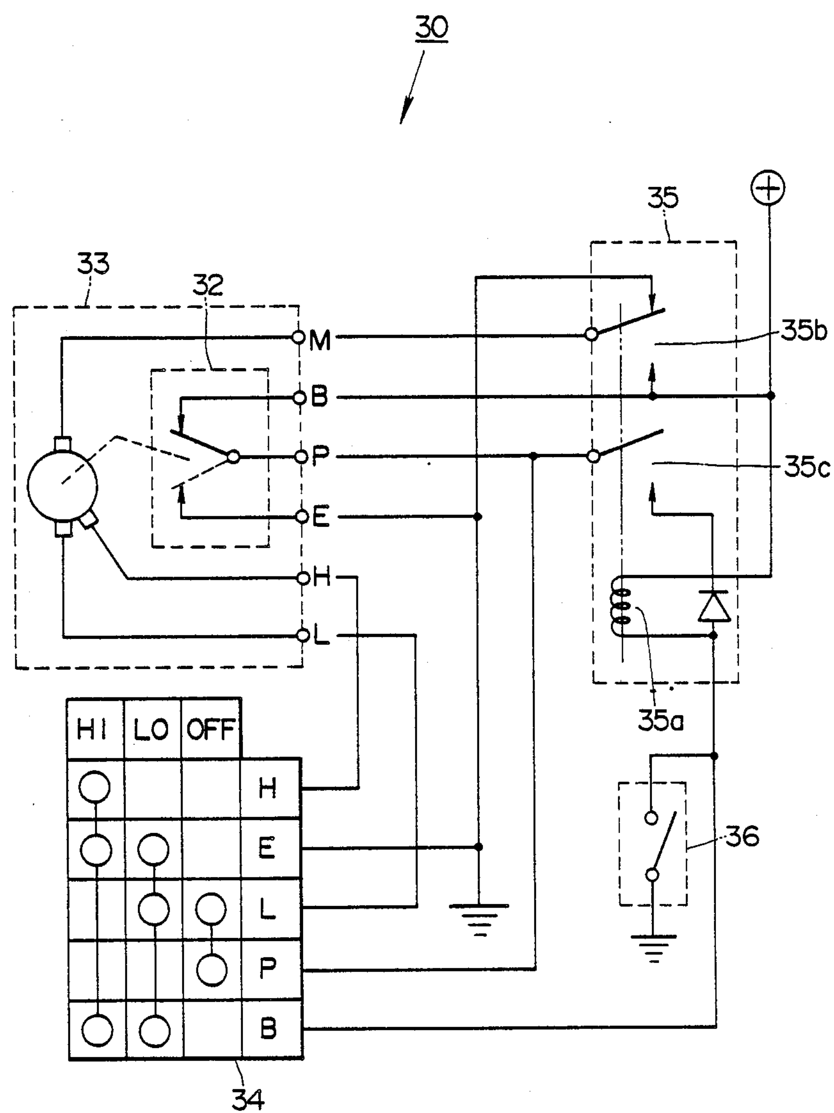
FIG. 4 is a circuit diagram in another embodiment of the electric windshield wiping apparatus according to the invention.
Figure 5:
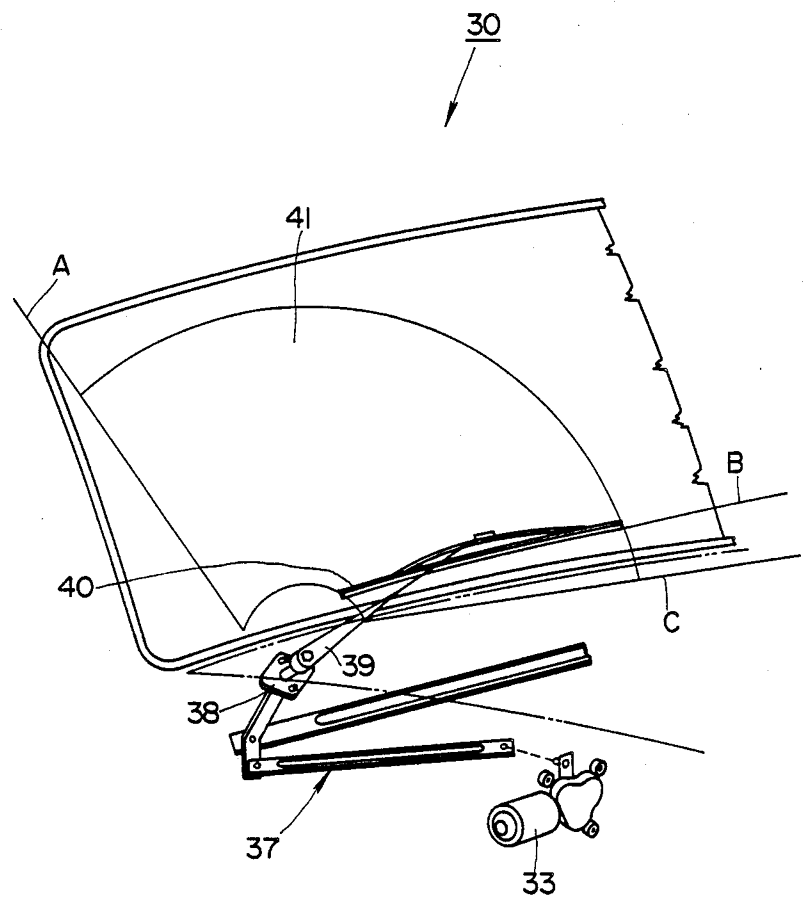
FIG. 5 is a schematic view illustrating a structure of the apparatus shown in FIG. 4.

In FIGS. 4 and 5 is shown a second embodiment of the electric windshield wiping apparatus according to the invention. This apparatus, shown in FIG. 4, has a circuit composed principally of a wiper motor 33 provided with an autostop switch 32 opening and closing the circuit in conjunction with rotation of the wiper motor 33, a wiper switch 34, a change-over relay 35 and a change-over switch 36 capable of independently performing the concealing operation. The mechanical components mainly comprise, as shown in FIG. 5, a link coupling mechanism 37 connected to the wiper motor 33, a wiper arm 39 attached to a pivot 38 constituting a part of the link coupling mechanism 37 and a wiper blade 40 attached to the top of the wiper arm 39.

The change-over switch 36 serves to establish a grounding circuit between a relay coil *35a* of the change-over relay 35 and a B terminal of the wiper switch 34 and is installed near to the driver's seat in the vehicle, for example, on the instrument panel.

When the wiper switch 34 is at the OFF position, the wiper blade 40 is stopped at a housing position C lower than a lower turning position B. That is, the autostop switch 32 provided in the wiper motor 33, which is connected to the wiper blade 40 through the link coupling mechanism 37, is at a position electrically connecting a P terminal and an E terminal of the wiper motor 33 by the changing of its relay contact to its lower position in the figure.

At the OFF position of the wiper switch 34, when the change-over switch 36 is changed to ON (conducting), a circuit is established from a power source through the relay coil *35a* in the change-over relay 35 to ground to thereby actuate the change-over relay 35. Thereby, relay contacts *35b* and *35c* in the change-over relay 35 are moved downward and electrically contact lower in FIG. 4

Thus, a circuit is established from the power source through the relay contact *35b* in the change-over relay 35 to the M terminal of the wiper motor 33. The circuit exits via the L terminal of the wiper motor 33 and continues through an L terminal and P terminal of the wiper switch 34 and traverses the autostop switch 32 through the P terminal and the E terminal of the wiper motor 33 and is finally grounded. Thereby, current is supplied to the wiper motor 33 and the wiper blade 40 begins to move toward the lower turning position B. When the P terminal of the auto stop switch 32 in the wiper motor 33 is connected to its B terminal in conjunction with rotation of the wiper motor 33 (that is, the wiper blade 40 reaches the lower turning position B), a motor armature short-circuit is established from the M terminal on the wiper motor 33 through the relay contact *35b* in the change-over relay 35 and through the B terminal of the autostop switch 32 and its P terminal and through the P terminal in the wiper switch 34 and its L terminal to the L terminal on the wiper motor 33. Therefore, the wiper motor 33 is stopped immediately by the dynamic braking. That is, the wiper blade 40 moves from the concealed or housed position C to the lower turning position B and stops at the position B.

At this state, when the wiper switch 34 is change to an ON position such as LO, a circuit is established from the power source through relay contact *35b* in the change-over relay 35 through the L terminal of the wiper switch 34 to ground to thereby supply current to the wiper motor 33. Thereby, the wiper motor 33 is rotated continuously in the forward direction. The rotation of the wiper motor 33 is converted into reciprocating movement of the wiper arm 39 through the link coupling mechanism 37, and the wiper blade 40 attached to the top portion of the wiper arm 39 is pushed to reciprocally move on a wiped surface 41 between the lower turning position B and the upper turning position A.

Then, when the wiper switch 34 is changed to an OFF position during the above reciprocating movement, the wiper motor 33 rotates when the P terminal of the autostop switch 32 is electrically connected with its E terminal (when the wiper blade 40 is on the wiped surface 41); and the rotation of the wiper motor 33 is stopped at a position such that the P terminal of the autostop switch 32 is connected with its B terminal (that is, the wiper blade 40 reaches the lower turning position B); that is, the wiper blade 40 stops at the lower turning position B and is never moved into the housing position C.

Namely, the preformance of the concealing operation can optionally be changed by properly operating the change-over switch 36.

As described above, according to the invention, the unit for electrically changing the performance of the reverse rotation of the wiper motor is detachably arranged between the wiper control mechanism and the wiper motor at a detachable state, so that the housing of the wiper blade can be easily concealed by the attachment of the unit in case of snowfall or freezing, and the replacement of the wiper blade and the cleaning thereof are easy. Particularly, when the unit is arranged near to a driver's seat in the vehicle, whether or not the wiper blade is concealed into the housing, housing position can be selected from inside without getting out from the passenger compartment.

What is claimed is:

1. An electric windsheld wiping apparatus, comprising:

a wiper switch for changing between a plurality of wiper modes;

a wiper motor for rotating forwardly and reversely;

a link connector mechanism connected to the wiper motor;

a wiper blade connected to said link connector mechanism and reciprocally moving between an upper turning position and a lower turning position on a wiped surface of a window;

a wiper control mechanism provided with an intermittent amplifier for the reciprocal movement of the wiper blade;

a wiring harness connecting said wiper switch and said wiper motor;

concealing means for moving the wiper blade downward from the lower turning position by a reverse rotation of the wiper motor and stopping said wiper blade at a given housing position; and a unit arranged detachably using a connector between said intermittent amplifier and said wiring harness and having a change-over switch therein for electrically controlling the actuation of the reverse rotation of the wiper motor.

2. The electric windshield wiping apparatus according to claim 1, where said change-over switch is arranged adjacent to a driver's seat within a driver's compartment of a vehicle bearing said window.

3. An electric windshield wiping apparatus, comprising:

a wiper motor for rotating forwardly and reversely;

a link connector mechanism connected to the wiper motor;

a wiper blade connected to said link connector mechanism and reciprocally moving between an upper turning position and a lower turning position on a wiped surface of a window;

a wiper control mechanism provided with a change-over relay which changes-over for forward rotation and reverse rotation of the wiper motor for the reciprocal movement of the wiper blade;

concealing means for moving the wiper blade downward from the lower turning position by a reverse rotation of the wiper motor and stopping said wiper blade at a given housing position; and a unit comprising a change-over switch arranged near to a driver's seat in a vehicle for electrically stopping the change-over action of the change-over relay and controlling the actuation of the reverse rotation ofthe wiper motor.

* * * * *